(12) United States Patent
Suzuki

(10) Patent No.: US 6,556,810 B2
(45) Date of Patent: Apr. 29, 2003

(54) COMMUNICATION INHIBITING DEVICE AND COMMUNICATION INHIBITING SYSTEM

(75) Inventor: Hiroshi Suzuki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/784,170

(22) Filed: Feb. 16, 2001

(65) Prior Publication Data

US 2001/0006886 A1 Jul. 5, 2001

Related U.S. Application Data

(63) Continuation of application No. PCT/JP99/04027, filed on Jul. 27, 1999.

(51) Int. Cl.⁷ .............................. H04B 1/38; H04B 1/10; H04B 1/66; H04B 1/034; H04B 1/06
(52) U.S. Cl. .............................. 455/88; 455/63; 455/66; 455/67.3; 455/419; 455/423; 455/411; 455/99; 455/115; 455/345
(58) Field of Search .............................. 455/63, 66, 418, 455/423, 411, 572, 99–115, 344, 345, 68, 456, 67.1, 67.3, 88; 370/336, 347

(56) References Cited

U.S. PATENT DOCUMENTS

| | | | | |
|---|---|---|---|---|
| 5,442,805 A | * | 8/1995 | Sagers et al. | 455/456 |
| 5,774,787 A | * | 6/1998 | Leopold et al. | 455/12.1 |
| 5,815,407 A | * | 9/1998 | Huffman et al. | 702/57 |
| 6,011,973 A | * | 1/2000 | Valentine et al. | 455/456 |
| 6,052,577 A | * | 4/2000 | Taguchi | 455/411 |
| 6,122,486 A | * | 9/2000 | Tanaka et al. | 455/68 |
| 6,201,973 B1 | * | 3/2001 | Kowaguchi | 455/456 |
| 6,438,385 B1 | * | 8/2002 | Heinonen et al. | 455/501 |

FOREIGN PATENT DOCUMENTS

| | | |
|---|---|---|
| JP | 3-179938 | 8/1991 |
| JP | 10-190557 | 7/1998 |
| JP | 10-200961 | 7/1998 |
| JP | 10-256979 | 9/1998 |
| JP | 10-294970 | 11/1998 |
| JP | 11-004190 | 1/1999 |
| JP | 11-88954 | 3/1999 |

* cited by examiner

Primary Examiner—Dwayne Bost
Assistant Examiner—Raymond Persino
(74) Attorney, Agent, or Firm—Rothwell, Figg, Ernst & Manbeck

(57) ABSTRACT

A communication inhibiting apparatus is provided with: disturbing wave generating means for generating a disturbing wave signal which disturbs communications to and from a portable telephone or similar communication terminal equipment; and disturbing wave emitting means for emitting the signal generated by said disturbing wave generating means, as said disturbing wave, to said communication terminal equipment.

3 Claims, 11 Drawing Sheets

US 6,556,810 B2

COMMUNICATION INHIBITING DEVICE AND COMMUNICATION INHIBITING SYSTEM

CROSS-REFERENCE TO THE RELATED APPLICATION

This Application is a continuation of International Application No. PCT/JP99/04027, whose International filing date is Jul. 27, 1999, the disclosures of which Application are incorporated by reference herein. The present application has not been published in English.

BACKGROUND OF THE INVENTION

1. Field of the Invention

The present invention relates to a communication inhibiting device and a communication inhibiting system for inhibiting the use of a portable telephone or similar communication terminal equipment at a place where its use is undesirable.

2. Description of the Related Art

FIG. 1 is a diagram explanatory of a conventional method for inhibiting communications to and from communication terminal equipment such as a portable telephone or the like. In FIG. 1, reference numeral 1 denotes an automobile or similar mobile unit, and 11 denotes a portable telephone or similar communication terminal equipment.

Next, the operation of the prior art example will be described.

Prior to the start of driving the mobile unit 1, a driver powers off the communication terminal equipment 11, sets it in an automatic answering mode or drive mode, or performs a similar manipulation to prevent the communication terminal equipment from receiving an incoming call after starting to drive, and during driving the driver himself does not make a call so as to avoid the use of the communication terminal equipment 11.

FIG. 2 is a diagram depicting a conventional communication-inhibiting device for a portable telephone or similar communication terminal equipment that is used in a theater or the like. In FIG. 2, reference numeral 2 denotes a theater; 11 denotes communication terminal equipment such as a portable telephone; 12 denotes disturbing wave generating means for generating a disturbing wave signal; and 13 denotes disturbing wave emitting antennas (disturbing wave emitting means). The communication-inhibiting device is composed of the disturbing wave generating means 12 and the disturbing wave emitting antennas 13.

Next, the operation of the communication-inhibiting device of FIG. 2 will be described below.

The disturbing wave generating means 12 and the disturbing wave emitting antennas 13 generate a widely spread disturbing wave of a relatively high intensity to disturb communications to and from the communication terminal equipment 11 to thereby inhibit its use.

The prior art example of FIG. 1 leaves it to the discretion of the user of the communication terminal equipment 11 or the driver of the mobile unit 1 whether to use the communication terminal equipment 11; that is, the prior art has no compelling force to inhibit the use of the communication terminal equipment.

The prior art example of FIG. 2 generates a widely spread disturbing wave of a relatively high intensity to produce the intended effect throughout the theater 2; hence, if the disturbing wave generating means 12 and the disturbing wave emitting antenna 13 are installed on the mobile unit 1 or the like, the disturbing wave spreads throughout and out of the mobile unit, producing the problem of hampering the use of the communication terminal equipment 11 by not only the driver and fellow passengers but also people around the car.

SUMMARY OF THE INVENTION

The present invention is intended to solve such problems as mentioned above, and has for its object to provide a communication inhibiting apparatus and a communication inhibiting system which inhibit communications to and from the communication terminal equipment 11 such as a portable telephone or the like at places where it is undesirable to use the communication terminal equipment 11.

A communication inhibiting apparatus according to an aspect of the present invention is provided with: disturbing wave generating means for generating a disturbing wave signal which disturbs communications to and from a portable telephone or similar communication terminal equipment; and disturbing wave emitting means for emitting the signal generated by said disturbing wave generating means, as said disturbing wave, to said communication terminal equipment.

With this apparatus, it is possible to forcibly inhibit communications to and from the communication terminal equipment at a place where its use is undesirable.

A communication inhibiting apparatus according to another aspect of the present invention has the disturbing wave emitting means embedded in the driver's seat of an automobile or similar mobile unit.

Accordingly, the disturbing wave emitting means can be installed out of the way.

A communication inhibiting apparatus according to another aspect of the present invention is provided with: travel/stop detecting means for detecting whether the automobile or similar mobile unit is traveling or stationary; and control means which, upon detecting the travel of said mobile unit by said travel/stop detecting means, controls the disturbing wave generating means to generate the disturbing wave signal and, upon detecting the stop of said mobile unit by said travel/stop detecting means, controls said disturbing wave generating means to discontinue the generation of said disturbing wave signal.

Accordingly, it is possible to inhibit the use of the communication terminal equipment during driving of the mobile unit.

A communication inhibiting apparatus according to another aspect of the present invention uses, as the travel/stop detecting means, speed detecting means for detecting the speed of the mobile unit.

Accordingly, it is possible to inhibit the use of the communication terminal equipment during driving of the mobile unit.

A communication inhibiting apparatus according to another aspect of the present invention uses a handbrake of the mobile unit as the travel/stop detecting means.

Accordingly, it is possible to inhibit the use of the communication terminal equipment during driving of the mobile unit.

A communication inhibiting apparatus according to another aspect of the present invention is provided with control means for controlling the disturbing wave generating means to generate the disturbing wave signal intermittently in the form of pulses.

Accordingly, it is possible to inhibit the use of the communication terminal equipment at a place where its use is undesirable and to cut the power consumption of the disturbing wave generating means.

A communication inhibiting apparatus according to another aspect of the present invention is provided with: transmitted wave detecting means for detecting a transmitted wave from the communication terminal equipment; and control means for controlling the disturbing wave generating means to generate the disturbing wave signal upon detecting said transmitted wave by said transmitted wave detecting means.

Accordingly, it is possible to inhibit the use of the communication terminal equipment at a place where its use is undesirable and to cut the power consumption of the disturbing wave generating means.

A communication inhibiting apparatus according to another aspect of the present invention is provided with antenna duplexer means for supplying the disturbing wave emitting means with the disturbing wave signal generated by the disturbing wave generating means and for supplying the transmitted wave detecting means with the transmitted wave from the communication terminal equipment received from said disturbing wave emitting means.

Accordingly, it is also possible to use the disturbing wave emitting means to receive the transmitted wave from the communication terminal equipment.

A communication inhibiting apparatus according to another aspect of the present invention is adapted so that the control means controls the disturbing wave generating means to generate the disturbing wave signal a predetermined time after the detection of the transmitted wave by the transmitted wave detecting means.

Accordingly, it is possible to inhibit the use of the communication terminal equipment at a place where its use is undesirable and to receive and transmit a data signal or a control signal within a predetermined time.

A communication inhibiting apparatus according to another aspect of the present invention is provided with storage means for storing frequency channel information on various mobile communication systems and is adapted so that, upon detecting the transmitted wave from the communication terminal equipment by the transmitted wave detecting means, the control means estimates, based on the frequency channel information stored in said storage means, the receiving frequency of said communication terminal equipment which is used corresponding to the frequency of said transmitted wave, and controls the frequency of the disturbing wave signal which is generated by the disturbing wave generating means.

Accordingly, it is possible to cut the power consumption of the disturbing wave generating means, narrow the band of the disturbing wave and hence prevent disturbing operations other than the intended one.

A communication inhibiting apparatus according to another aspect of the present invention is provided with storage means for storing frequency band information and TDMA slot information on the time axis of TDMA mobile communication systems and is adapted so that, upon detecting the transmitted wave from the communication terminal equipment by the transmitted wave detecting means, the control means estimates, based on the frequency band information and the TDMA slot information stored in said storage means, the receiving frequency of the communication terminal equipment which is used corresponding to the frequency of said transmitted wave, and controls the frequency and generation timing of the disturbing wave signal which is generated by the disturbing wave generating means.

Accordingly, it is possible to cut the power consumption of the disturbing wave generating means, narrow the band of the disturbing wave and hence prevent disturbing operations other than the intended one.

A communication inhibiting system according to another aspect of the present invention is provided with: beacon signal generating means for generating a beacon signal of a predetermined frequency to a limited area; and a portable telephone or similar communication terminal equipment which detects the beacon signal generated by said beacon signal generating means and turns off its communication function.

Accordingly, it is possible to inhibit the use of the communication terminal equipment at a place where its use is undesirable.

A communication inhibiting system according to another aspect of the present invention is adapted so that the beacon signal generating means generates an infrared-ray or similar optical signal as the beacon signal.

Accordingly, it is possible to inhibit the use of the communication terminal equipment at a relatively small place where its use is undesirable.

A communication inhibiting system according to another aspect of the present invention is adapted so that the beacon signal generating means is installed in the driver's seat of an automobile or similar mobile unit.

Accordingly, it is possible to inhibit the use of the communication terminal equipment in the driver's seat of a mobile unit and install the beacon signal generating means out of the way.

A communication inhibiting system according to another aspect of the present invention is adapted so that, upon detecting the beacon signal, the communication terminal equipment is set in an automatic answering mode.

Accordingly, it is possible to inhibit the use of the communication terminal equipment at a place where its use is undesirable and to record received messages.

A communication inhibiting system according to another aspect of the present invention is adapted so that when the communication terminal equipment keeps its communication function off after the detection of the beacon signal, a call to a pre-registered emergency contact address is enabled.

Accordingly, it is possible to deal with an emergency flexibly.

A communication inhibiting system according to another aspect of the present invention is provided with notifying means for notifying a user of the communication terminal equipment that its communication function is off when the communication terminal equipment keeps the communication function off after the detection of the beacon signal.

Accordingly, it is possible for the user to learn that the communication function is off.

A communication inhibiting system according to another aspect of the present invention is provided with: travel/stop detecting means for detecting whether the automobile or similar mobile unit is traveling or stationary; and control means which, upon detecting the travel of said mobile unit by said travel/stop detecting means, controls the beacon signal generating means to generate the beacon signal and, upon detecting the stop of said mobile unit by said travel/stop detecting means, controls said beacon signal generating means to discontinue the generation of said beacon signal.

Accordingly, it is possible to inhibit the use of the communication terminal equipment while the mobile unit is traveling.

A communication inhibiting system according to another aspect of the present invention is provided with control means for controlling the beacon signal generating means to generate the beacon signal intermittently in the form of pulses.

Accordingly, it is possible to inhibit the use of the communication terminal equipment at a place where its use is undesirable and to cut the power consumption of the beacon signal generating means.

A communication inhibiting system according to still another aspect of the present invention is provided with: transmitted wave detecting means for detecting a transmitted wave from the communication terminal equipment; and control means for controlling the beacon signal generating means to generate the beacon signal upon detecting said transmitted wave by said transmitted wave detecting means.

Accordingly, it is possible to inhibit the use of the communication terminal equipment at a place where its use is undesirable and to cut the power consumption of the beacon signal generating means.

DETAILED DESCRIPTION OF THE PREFERRED EMBODIMENTS

To facilitate a better understanding of the present invention, a description will be given, with reference to the accompanying drawings, of the best mode for carrying out the invention.

Embodiment 1

Figure 1:
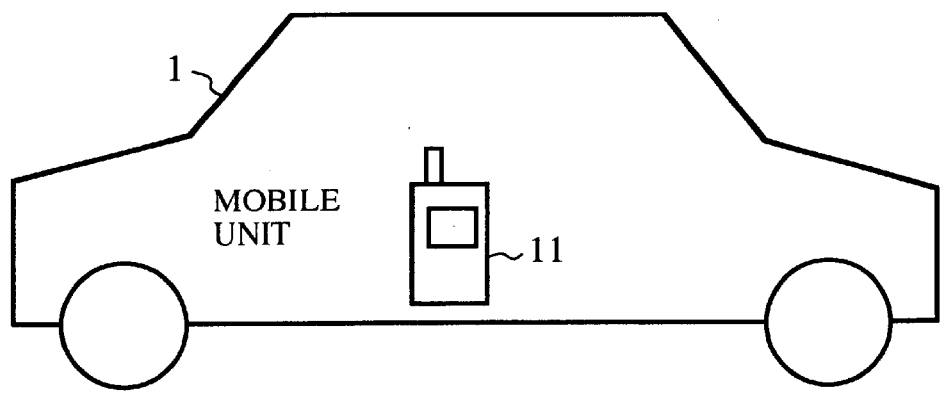
FIG. 1 is a diagram explanatory of a conventional method for inhibiting communications.
Figure 2:
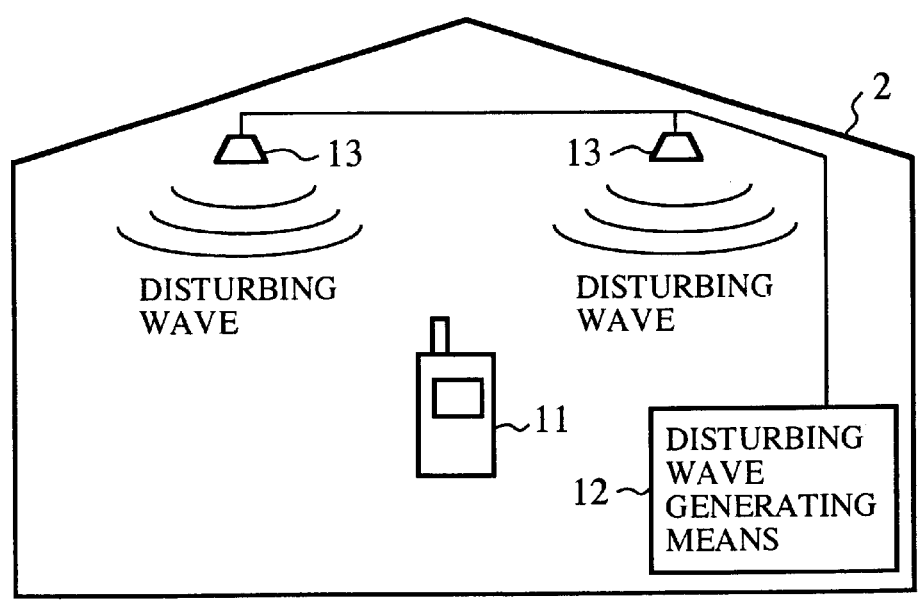
FIG. 2 is a diagram depicting the configuration of a conventional communication inhibiting apparatus.
Figure 3:
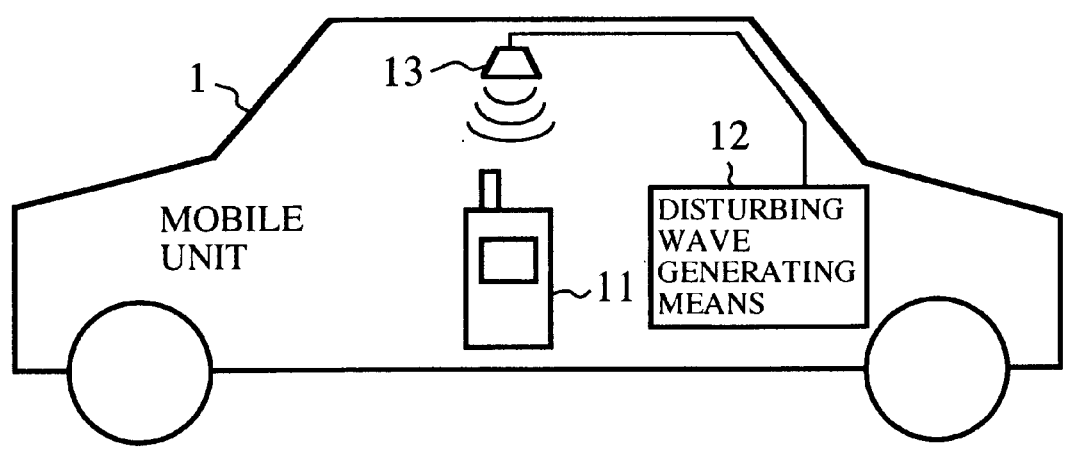
FIG. 3 is a diagram illustrating the configuration of a communication inhibiting apparatus according to a first embodiment of the present invention.

FIG. 3 is a diagram illustrating the configuration of a communication inhibiting apparatus according to a first embodiment (Embodiment 1) of the present invention. In FIG. 3, reference numeral 1 denotes an automobile or similar mobile unit; 11 denotes disturbing wave generating means for generating a disturbing wave signal; and 13 denotes a directional disturbing wave emitting antenna (disturbing wave emitting means).

The communication inhibiting apparatus according to this embodiment comprises the disturbing wave generating means 12 and the directional disturbing wave emitting antenna 13, and forcefully inhibits the use of the communication terminal equipment 11 in the driver's seat of the mobile unit 1.

Next, the operation of this embodiment will be described below.

The disturbing wave generating means 12 generates a signal of a frequency in the receiving frequency band of the communication terminal equipment 11. The signal thus generated is emitted, as a disturbing wave for the communication terminal equipment 11, from the directional disturbing wave emitting antenna 13 toward the driver's seat of the mobile unit 1 with low intensity sufficient for propagation only in the mobile unit 1.

With the disturbing wave thus directed specifically thereto, the communication terminal equipment 11, if placed in the driver's seat, can no longer operate normally and hence is disabled. In this way, the driver of the mobile unit 1 is inhibited from using the communication terminal equipment in the driver's seat. Furthermore, since the disturbing wave emitting antenna 13 is directional, the communication terminal equipment 11 can be used in other seats than the driver's one.

As described above, according to Embodiment 1, the signal generated by the disturbing wave generating means 12 is emitted, as a disturbing wave, from the directional disturbing wave emitting antenna 13 specifically to the driver's seat of the mobile unit 1, by which it is possible to inhibit the driver of the mobile unit 1 from using the communication terminal equipment 11 in the driver's seat.

Embodiment 2

Figure 4:
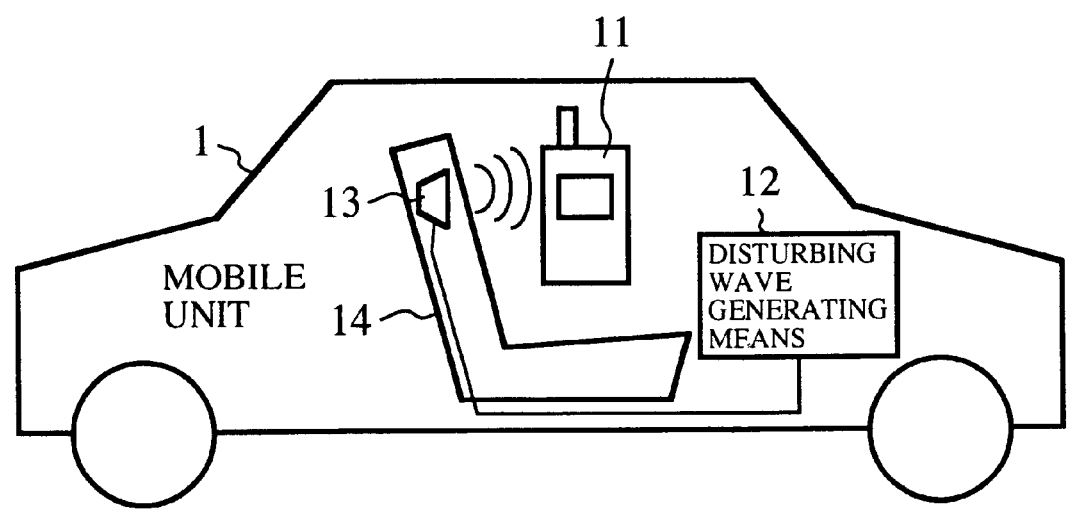
FIG. 4 is a diagram illustrating the configuration of a communication inhibiting apparatus according to a second embodiment of the present invention.

FIG. 4 is a diagram depicting the configuration of a communication inhibiting apparatus according to a second embodiment (Embodiment 2) of the present invention. In FIG. 4, reference numeral 14 denotes the back of the driver's seat with the disturbing wave emitting antenna 13 (disturbing wave emitting means) embedded therein; the configuration of this embodiment is identical with the FIG. 3 configuration of Embodiment 1 except the above.

The communication inhibiting apparatus of this embodiment is also composed of the disturbing wave generating means 12 and the directional disturbing wave emitting antenna 13, and is intended to inhibit the use of the communication terminal equipment 11, such as a portable telephone, in the driver's seat of the mobile unit 1 such as an automobile.

Next, the operation of this embodiment will be described below.

Since the directional disturbing wave emitting antenna 13 is embedded in the back of the driver's seat of the mobile unit 1, the disturbing wave emitting antenna 13 can be installed extremely close to the position where the communication equipment 11 is usually used and hence kept out of the way; thus, the disturbing wave can easily be focused at the driver's seat alone.

As described above, according to Embodiment 2, the signal generated by the disturbing wave generating means 12 is emitted, as a disturbing wave, from the disturbing wave emitting antenna 13 embedded in the back of the driver's seat of the mobile unit 1, by which it is possible to inhibit the driver of the mobile unit 1 from using the communication terminal equipment 11 in the driver's seat; furthermore, the disturbing wave emitting antenna 13 can be installed out of the way of the use of the communication terminal equipment by a fellow passenger.

Embodiment 3

Figure 5:
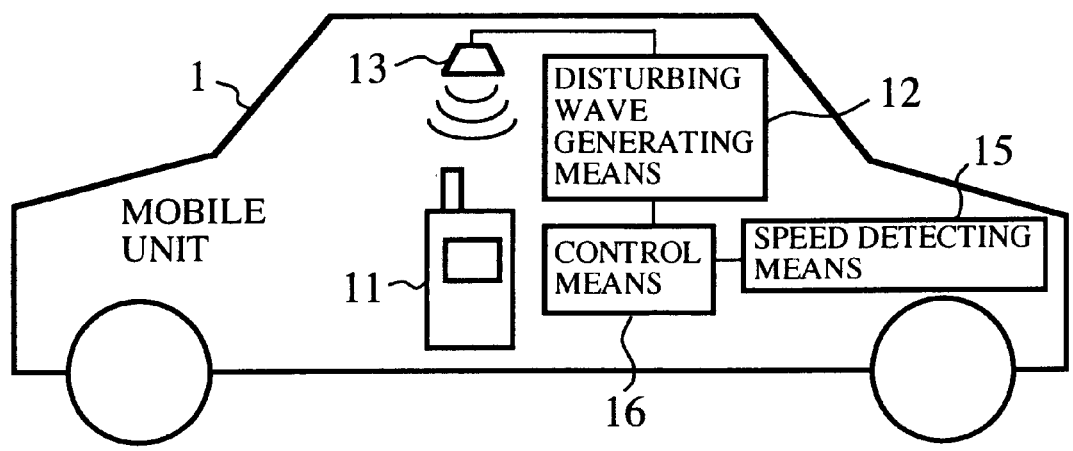
FIG. 5 is a diagram illustrating the configuration of a communication inhibiting apparatus according to a third embodiment of the present invention.

FIG. 5 is a diagram depicting the configuration of a communication inhibiting apparatus according to a third embodiment (Embodiment 3) of the present invention. In FIG. 5, reference numeral 15 denotes speed detecting means (travel/stop detecting means) for detecting the travel/stop of the mobile unit 1 such an automobile, and 16 denotes control means for controlling the disturbing wave generating means 12 based on the result of detection by the speed detecting means 15; the configuration of this embodiment is identical with the FIG. 3 configuration of Embodiment 1 except the above.

The communication inhibiting apparatus of this embodiment is composed of the disturbing wave generating means 12, the disturbing wave emitting antenna (disturbing wave emitting means) 13, the speed detecting means 15 and the control means 16, and is intended to inhibit the use of the communication terminal equipment 11, such as a portable telephone, while the mobile unit 1 is traveling; this embodiment uses the speed detecting means 15 as the travel/stop detecting means, and emits the disturbing wave during traveling of the mobile unit 1.

Next, the operation of this embodiment will be described below.

The speed detecting means 15 detects the travel/stop of the mobile unit 1 based on its travel speed, and when the travel speed is 0, that is, when the mobile unit 1 is at a standstill, the speed detecting means 15 sends to the control means 16 information indicating that the mobile unit 1 is at a standstill. The control means 16 responds to the information from the speed detecting means 15 to control the disturbing wave generating means 12 not to generate the disturbing wave.

Thus, when the mobile unit 1 is at a standstill, the communication terminal equipment 11 can be used.

On the other hand, when the mobile unit 1 is traveling, the speed detecting means 15 sends to the control means 16 information indicating that the mobile unit 1 is traveling. The control means 16 responds to the information from the speed detecting means 15 to control the disturbing wave generating means 12 to emit the disturbing wave from the disturbing wave emitting antenna 13.

Thus, when the mobile unit 1 is traveling, the communication terminal equipment 11 cannot be used; therefore, if the necessity for using the communication terminal equipment 11 arises, the driver is required to stop the driving of the mobile unit 1.

Incidentally, by using a directional antenna as the disturbing wave emitting antenna 13 as in Embodiments 1 and 2, the person who is inhibited from using the communication terminal equipment 11 during traveling of the mobile unit 1 can easily be narrowed down to the driver in the driver's seat.

As described above, according to Embodiment 3, the travel or standstill of the mobile unit 1 is detected by the speed detecting means 15, and if the mobile unit 1 is traveling, the control means 16 controls the disturbing wave generating means 12 to emit the disturbing wave, inhibiting the use of the communication terminal equipment 11.

Embodiment 4

Figure 6:
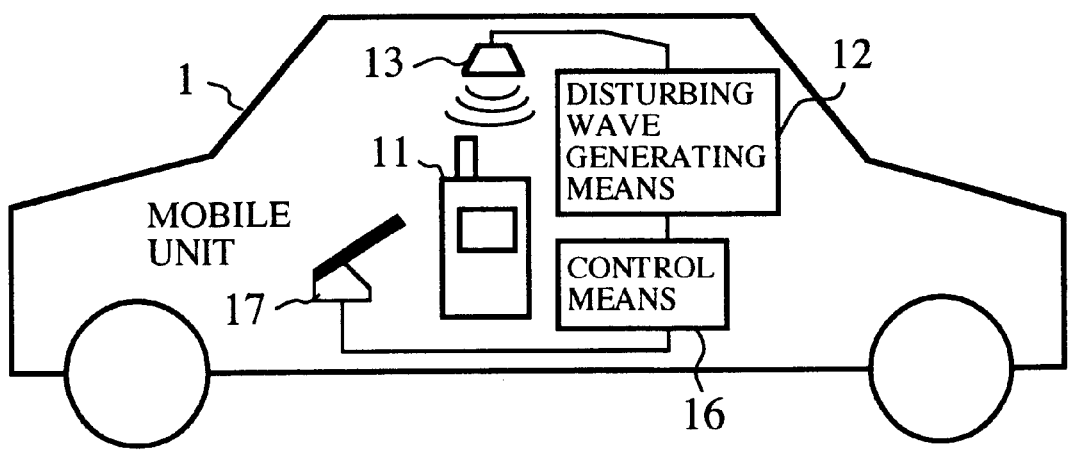
FIG. 6 is a diagram illustrating the configuration of a communication inhibiting apparatus according to a fourth embodiment of the present invention.

FIG. 6 is a diagram depicting the configuration of a communication inhibiting apparatus according to a fourth embodiment (Embodiment 4) of the present invention. In FIG. 6, reference numeral 17 denotes a handbrake (travel/stop detecting means) of the mobile unit 1 such as an automobile; the configuration of this embodiment is identical with the FIG. 5 configuration of Embodiment 3 except the above.

The communication inhibiting apparatus of this embodiment is composed of the disturbing wave generating means 12, the disturbing wave emitting antenna (disturbing wave emitting means) 13, the control means 16 and the handbrake 17, and is intended to inhibit the use of the communication terminal equipment 11 such as a portable telephone while the mobile unit 1 is traveling; this embodiment uses the handbrake as the travel/stop detecting means, and emits the disturbing wave while the mobile unit 1 is traveling.

Next, the operation of this embodiment will be described below.

When the mobile unit 1 is at a standstill, the control means 16 detects the on state of the handbrake and controls the disturbing wave generating means 12 not to generate the disturbing wave.

Thus, while the mobile unit 1 is at a standstill, the communication terminal equipment 11 can be used.

On the other hand, when the handbrake 17 is released the mobile unit 1 starts to travel, the control means 16 detects the off state of the handbrake 17 and controls the disturbing wave generating means 12 to emit the disturbing wave from the disturbing wave emitting antenna 13.

Thus, when the mobile unit 1 is traveling, the communication terminal equipment 11 cannot be used; therefore, if the necessity for using the communication terminal equipment 11 arises, the driver is required to stop the driving of the mobile unit 1 and put on the handbrake 17.

As described above, according to Embodiment 7, the travel or standstill of the mobile unit 1 is detected by the handbrake 17, and while the mobile unit 1 is traveling, the control means 16 controls the disturbing wave generating means 12 to generate the disturbing wave, inhibiting the use of the communication terminal equipment 11.

Embodiment 5

Figure 7:
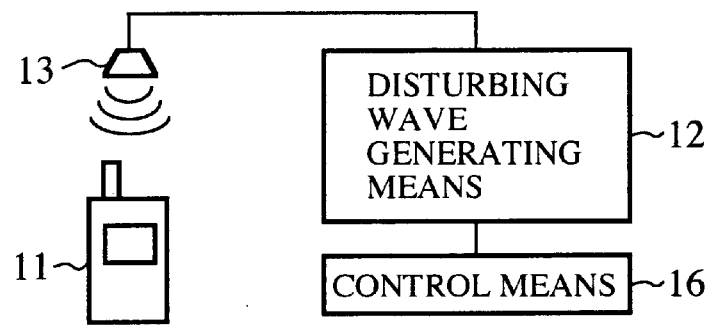
FIG. 7 is a diagram illustrating the configuration of a communication inhibiting apparatus according to a fifth embodiment of the present invention.

FIG. 7 is a diagram depicting the configuration of a communication inhibiting apparatus according to a fifth embodiment (Embodiment 5) of the present invention. In FIG. 7, reference numeral 11 denotes a portable telephone or similar communication terminal equipment; 12 denotes a disturbing wave generating means for generating a disturbing wave signal; 13 denotes a disturbing wave emitting antenna (disturbing wave emitting means); and 16 denotes control means for controlling the disturbing wave generating means 12 to generate the disturbing wave signal intermittently on a pulse-wise basis.

The communication inhibiting apparatus of this embodiment is composed of the disturbing wave generating means 12, the disturbing wave emitting antenna 13 and the control means, and is intended to inhibit the use of the communication terminal equipment 11 at places where it is undesirable to use the communication terminal equipment 11 such as a portable telephone.

Next, the operation of this embodiment will be described below.

Figure 8:
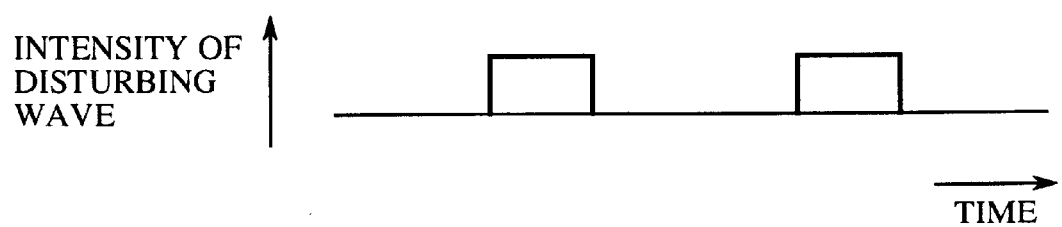
FIG. 8 is a diagram showing the timing for the emission of disturbing waves according to the fifth embodiment of the present invention.

FIG. 8 is s diagram showing the emission timing of the disturbing wave. The disturbing wave generating means 12 is controlled by the control means 16 to intermittently generate the disturbing wave in the form of pulses from the disturbing wave emitting antenna 13 with low intensity as depicted in FIG. 8.

Accordingly, even if a user tries to use the communication terminal equipment 11 at a place where the use of the communication terminal equipment 11 is undesirable, the intermittently emitted disturbing wave seriously deteriorates the speech quality, making it virtually difficult to use the terminal equipment.

Thus, the use of the communication terminal equipment 11 is inhibited by emitting the disturbing wave to the place where the use of the communication terminal equipment 11 is undesirable. Furthermore, the intermittent generation of the disturbing wave signal in pulse form by the disturbing wave generating means 12 under the control of the control means reduces the power consumption of the disturbing wave generating means 12.

As described above, according to Embodiment 5, the disturbing wave generating means 12 intermittently generates the disturbing wave in the form of pulses from the disturbing wave emitting antenna 13 to the place where the use of the communication terminal equipment 11 is undesirable, by which it is possible to inhibit the use of the communication terminal equipment 11 and reduce the power consumption of the disturbing wave generating means 12.

Embodiment 6

Figure 9:
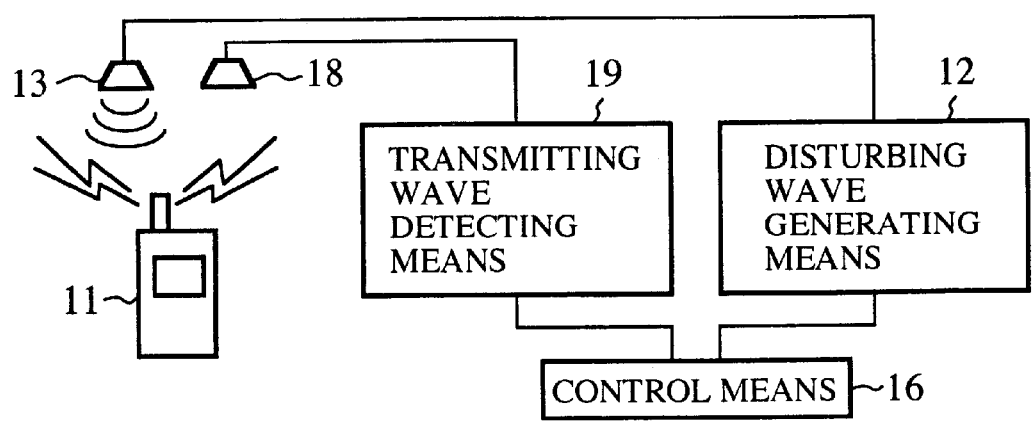
FIG. 9 is a diagram illustrating the configuration of a communication inhibiting apparatus according to a sixth embodiment of the present invention.

FIG. 9 is a diagram depicting the configuration of a communication inhibiting apparatus according to a sixth embodiment (Embodiment 6) of the present invention. In FIG. 9, reference numeral 18 denotes a transmitting wave detecting antenna for receiving a transmitting wave from the communication terminal equipment 11 such as a portable telephone; 19 denotes transmitting wave detecting means for detecting, from the transmitting wave received by the transmitting wave detecting antenna 18, the outputting of the transmitting wave from the communication terminal equipment 11; and 16 denotes control means for controlling the disturbing wave generating means 12 based on the result of detection by the transmitting wave detecting means 19. The configuration of this embodiment is identical with the FIG. 7 configuration of Embodiment 7 except the above.

The communication inhibiting apparatus of this embodiment is composed of the transmitting wave detecting antenna 18, the transmitting wave detecting means 19, the control means 16, the disturbing wave generating means 12 and the disturbing wave emitting antenna (disturbing wave emitting means) 13, and is intended to stop the use of the communication terminal equipment 11 such as a portable telephone when the communication terminal equipment 11 is used at a place where its use is undesirable.

Next, the operation of this embodiment will be described below.

Figure 10:
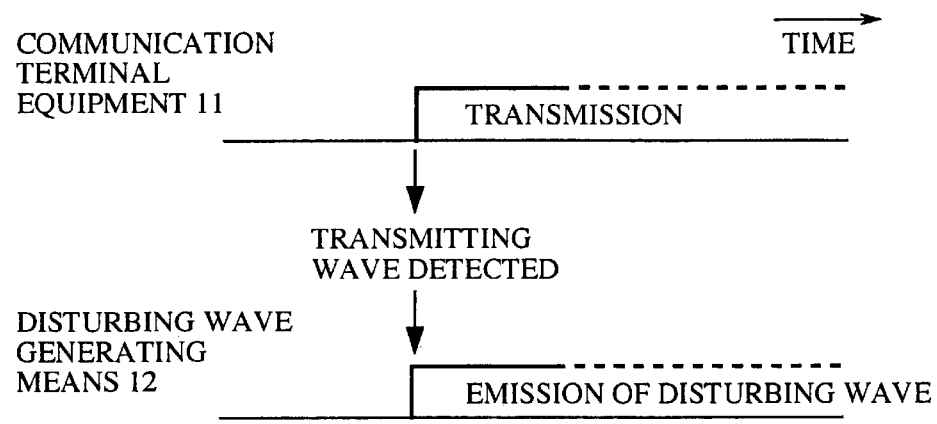
FIG. 10 is a diagram showing the operation timing of communication terminal equipment and disturbing wave generating means according to a sixth embodiment of the present invention.

FIG. 10 is a diagram showing the operation timing of the communication terminal equipment 11 and the disturbing wave generating means 12. When a user uses the communication terminal equipment 11 at a place where its use is undesirable and the communication terminal equipment 11 outputs a transmitting wave accordingly, the transmitting wave detecting means 19 detects the transmitting wave received by the transmitting wave detecting antenna 18, and sends to the control means 16 information that the communication terminal equipment 11 is in use.

Upon receiving the information that the communication terminal equipment 11 is being used at the place where its use is undesirable, the control means 16 controls the disturbing wave generating means 12 to emit the disturbing wave from the disturbing wave emitting antenna 13 as shown in FIG. 10, thereby preventing the communication from the communication terminal equipment 11.

Thus, the disturbing wave is emitted to the place where the use of the communication terminal equipment 11 is undesirable, thereby inhibiting the use of the communication terminal equipment 11. And, when the communication terminal equipment 11 outputs no transmitting wave, the control means 16 controls the disturbing wave generating means 12 to stop the emission of the disturbing wave 12, reducing the power consumption of the disturbing wave generating means 12.

As described above, according to Embodiment 6, when the communication terminal equipment 11 is used at the place where its use is undesirable, the disturbing wave generating means 12 emits the disturbing wave from the disturbing wave emitting antenna 13, by which it is possible to inhibit the use of the communication terminal equipment 11 and cut the power consumption of the disturbing wave generating means 12.

Embodiment 7

Figure 11:
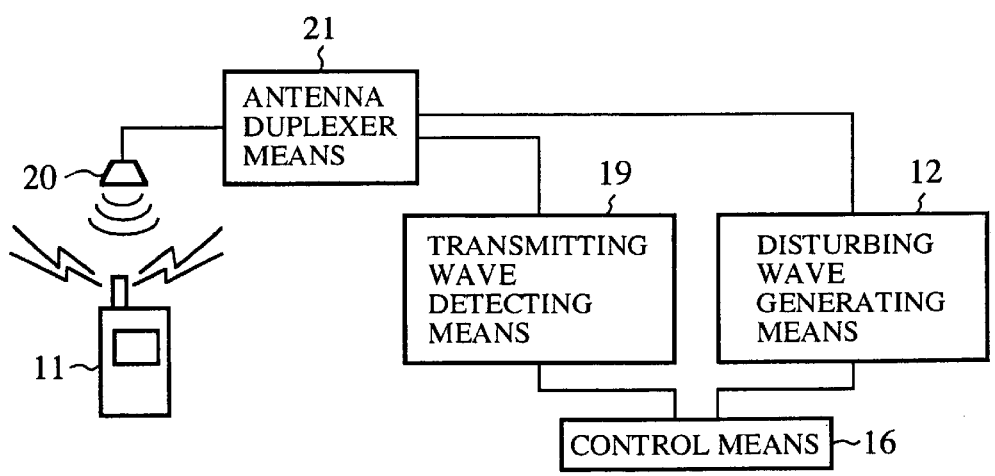
FIG. 11 is a diagram illustrating the configuration of a communication inhibiting apparatus according to a seventh embodiment of the present invention.

FIG. 11 is a diagram depicting the configuration of a communication inhibiting apparatus according to a seventh embodiment (Embodiment 7) of the present invention. In FIG. 11, reference numeral 20 denotes an antenna for receiving the transmitted wave from the communication terminal equipment 11 such as a portable telephone and emitting the disturbing wave (disturbing wave emitting means); and 21 denotes an antenna duplexer for sending to the transmitted wave detecting means 19 the transmitted wave from the communication terminal equipment 11 received by the antenna 20 and for supplying the signal from the disturbing wave generating means 12 to the antenna 20. The configuration of this embodiment is identical with the FIG. 9 configuration of Embodiment 6 except the above.

The communication inhibiting apparatus of this embodiment is composed of the antenna 20, the antenna duplexer 21, the transmitted wave detecting means 19, the control means 16, and the disturbing wave generating means, and is intended to stop the use of the communication terminal equipment 11 such as a portable telephone when the communication terminal equipment 11 is used at a place where its use is undesirable.

Next, the operation of this embodiment will be described below.

When a user uses the communication terminal equipment 11 at a place where its use is undesirable and the communication terminal equipment 11 outputs a transmitting wave accordingly, the transmitted wave detecting means 19 detects the transmitted wave received by the transmitted wave detecting antenna 18 via the antenna duplexer 21, and sends to the control means 16 information that the communication terminal equipment 11 is in use.

Upon receiving the information that the communication terminal equipment 11 is being used at the place where its use is undesirable, the control means 16 controls the disturbing wave generating means 12 to emit the disturbing wave from the disturbing wave emitting antenna 13 via the antenna duplexer 21 as shown in FIG. 10, thereby preventing the communication from the communication terminal equipment 11.

Thus, the disturbing wave is emitted to the place where the use of the communication terminal equipment 11 is undesirable, thereby inhibiting the use of the communication terminal equipment 11. And, when the communication terminal equipment 11 outputs no transmitting wave, the control means 16 controls the disturbing wave generating means 12 to stop the emission of the disturbing wave 12, reducing the power consumption of the disturbing wave generating means 12.

As described above, according to Embodiment 7, when the communication terminal equipment 11 is used at the place where its use is undesirable, the disturbing wave generating means 12 emits the disturbing wave from the disturbing wave emitting antenna 13, by which it is possible to inhibit the use of the communication terminal equipment 11 and cut the power consumption of the disturbing wave generating means 12.

Moreover, the use of the antenna duplexer means 21 makes it possible to use one antenna both as the disturbing wave emitting antenna 13 and as the transmitted wave detecting antenna 18 in Embodiment 6.

Embodiment 8

The communication inhibiting apparatus according to Embodiment 8 is identical in configuration with the apparatus of an eighth embodiment (Embodiment 8) depicted in FIG. 9, and is intended to disable the communication terminal equipment 11 such as a portable telephone after a certain elapsed time in the case where the communication terminal equipment 11 is used at a place where its use is undesirable.

Next, the operation of this embodiment will be described below.

Figure 12:
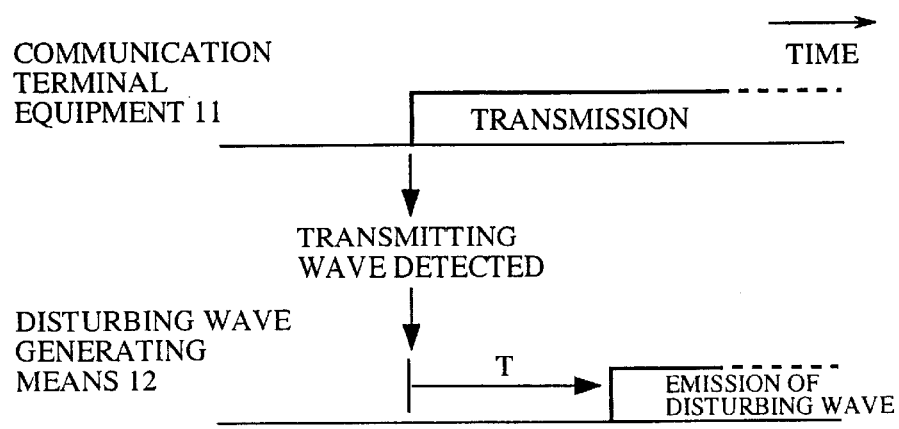
FIG. 12 is a diagram showing the operation timing of communication terminal equipment and disturbing wave generating means according to an eighth embodiment of the present invention.

FIG. 12 is a diagram showing the operation timing of the communication terminal equipment 11 and the disturbing wave generating means 12. When a user uses the communication terminal equipment 11 at the place where its use is undesirable and the communication terminal equipment 11 outputs a transmitting wave accordingly, the information that the communication terminal equipment 11 is in use is sent to the control means 16 as is the case with Embodiment 6.

Upon receiving the information that the communication terminal equipment 11 is being used at the place where its use is undesirable, the control means 16 controls the disturbing wave generating means 12 to emit the disturbing wave from the disturbing wave emitting antenna (disturbing wave emitting means) 13 after the lapse of a predetermined time T as shown in FIG. 12, thereby preventing the communication from the communication terminal equipment 11.

The predetermined time T after which the disturbing wave is emitted is set not long enough to establish a call but long enough to send and receive a data signal, a control signal and so on.

Accordingly, in the case of an incoming call to the communication terminal equipment 11, the user of the communication terminal equipment 11 cannot answer the incoming call but can learn it by an incoming indicator tone or by keeping a history of incoming calls. Furthermore, it is possible to allow the reception of a character mail, voice mail or similar incoming call of a short duration. It is also possible to avoid disturbing a transmitting operation for position registration and keep the communication terminal equipment 11 in its standby state at all times. As a result, the communication terminal equipment 11 does not repeat channel scanning and the trial operation for position registration, making it possible to suppress unnecessary power consumption.

As described above, according to Embodiment 8, when the communication terminal equipment 11 is used at the place where its use is undesirable, the disturbing wave generating means 12 emits the disturbing wave from the disturbing wave emitting antenna 13, by which it is possible not only to inhibit the use of the communication terminal equipment 11 but also to cut the power consumption of the disturbing wave generating means 12.

Besides, since the disturbing wave is emitted the predetermined time T after the detection of the transmitted wave from the communication terminal equipment 11, a data signal, a control signal and so on can be transmitted and received during the predetermined time interval T.

Embodiment 9

Figure 13:
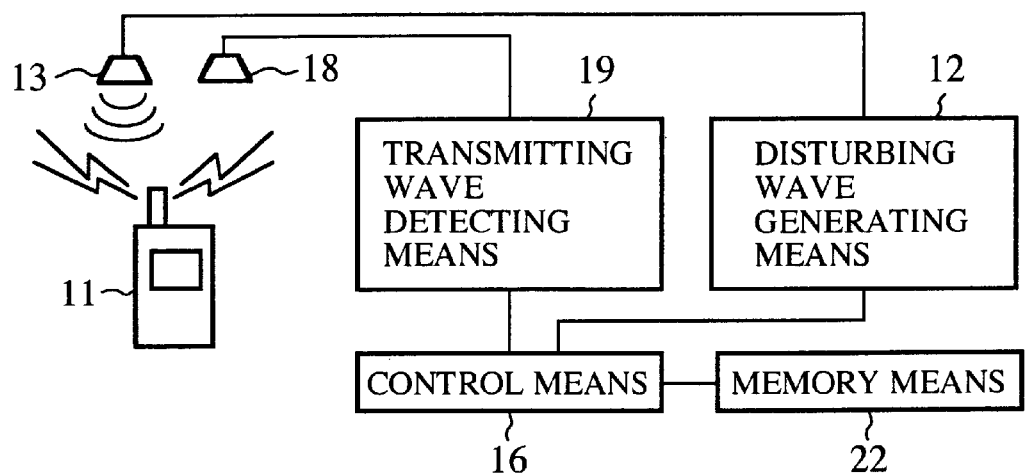
FIG. 13 is a diagram illustrating the configuration of a communication inhibiting apparatus according to a ninth embodiment of the present invention.

FIG. 13 is a diagram depicting the configuration of a communication inhibiting apparatus according to a ninth embodiment (Embodiment 9) of the present invention. In FIG. 13, reference numeral 22 denotes storage means wherein there is stored information about frequency bands used in various mobile communication systems of the communication terminal equipment 11 such as a portable telephone; this embodiment is identical in configuration with Embodiment 6 depicted in FIG. 9.

The communication inhibiting apparatus of this embodiment is composed of the transmitted wave detecting antenna 18, the transmitted wave detecting means 19, the storage means 22, the control means 16, the disturbing wave generating means 12 and the disturbing wave emitting antenna (disturbing wave emitting means) 13, and is adapted to narrow the band of the disturbing wave that is emitted to inhibit the use of the communication terminal equipment 11 when it is used at the place where its use is undesirable.

Next, the operation of this embodiment will be described below.

Figure 14:
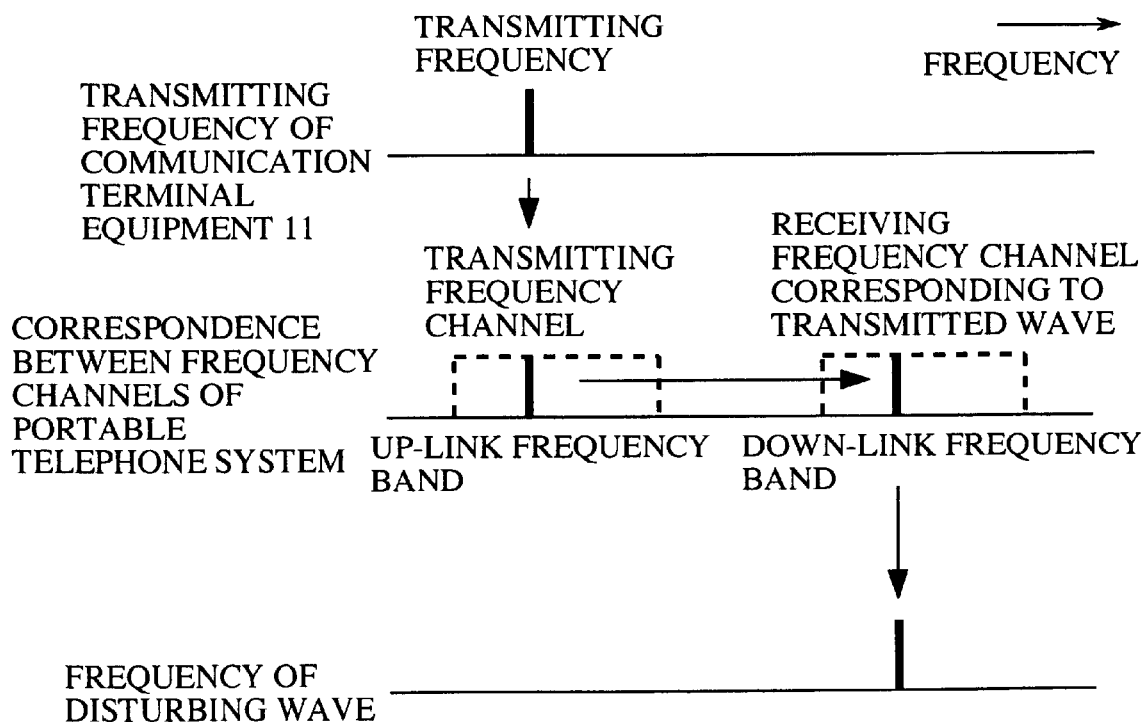
FIG. 14 is a diagram showing the relationship between a transmit frequency of communication terminal equipment and a disturbing wave frequency according to the ninth embodiment of the present invention.

FIG. 14 is a diagram showing the relationship between the frequency of the transmitting wave from the communication terminal equipment 11 and the frequency of the disturbing wave. Upon detecting the transmitting wave of the communication terminal equipment 11 by the transmitted wave detecting means 19, the control means 16 measures a transmitting wave frequency channel in an up-link frequency band, and specifies the receiving frequency channel in a down-link frequency band that is used corresponding to the transmitting wave frequency, by referring to the frequency band information on various mobile communication systems prestored in the storage means 22.

And, the control means 16 controls the disturbing wave generating means 12 to emit a disturbing wave of the thus specified receiving frequency. The emission of the disturbing wave of the specified receiving frequency is aimed at narrowing the band of the disturbing wave, thereby preventing unnecessary disturbing operations other than the intended one and further cutting the power consumption of the disturbing wave generating means 12.

As described above, according to Embodiment 9, information on the frequency bands used in various mobile communication systems are prestored in the storage means 22; and when the communication terminal equipment 11 is used at the place where its use is undesirable, the control means specifies, by referring to the storage means 22, the receiving frequency channel of the communication terminal equipment 22 that corresponds to its transmitting frequency channel detected by the transmitted wave detecting means 19, and controls the disturbing wave generating means 12 to generate the disturbing wave at the specified receiving frequency. This embodiment provides a narrow-band disturbing wave for inhibiting the use of the communication terminal equipment 11, thereby preventing unnecessary disturbing operations other than the intended one and, at the same time, reducing the power consumption of the disturbing wave generating means 12.

Embodiment 10

The configuration of the communication inhibiting apparatus according to a tenth embodiment (Embodiment 10) is identical with the configuration of Embodiment 9 shown in FIG. 13; the storage means 22 has prestored therein information about TDMA time slots on the time axis in a TDMA (time division Multiple Access) mobile communication system as well as the frequency band information about various mobile communication systems.

This embodiment is intended to narrow the band of the disturbing wave that is emitted to inhibit the use of the communication terminal equipment 11 such as a portable telephone of the TDMA system at the place where its use is undesirable, and this embodiment is to limit the emission of the disturbing wave on the time axis.

Next, the operation of this embodiment will be described below.

Figure 15:
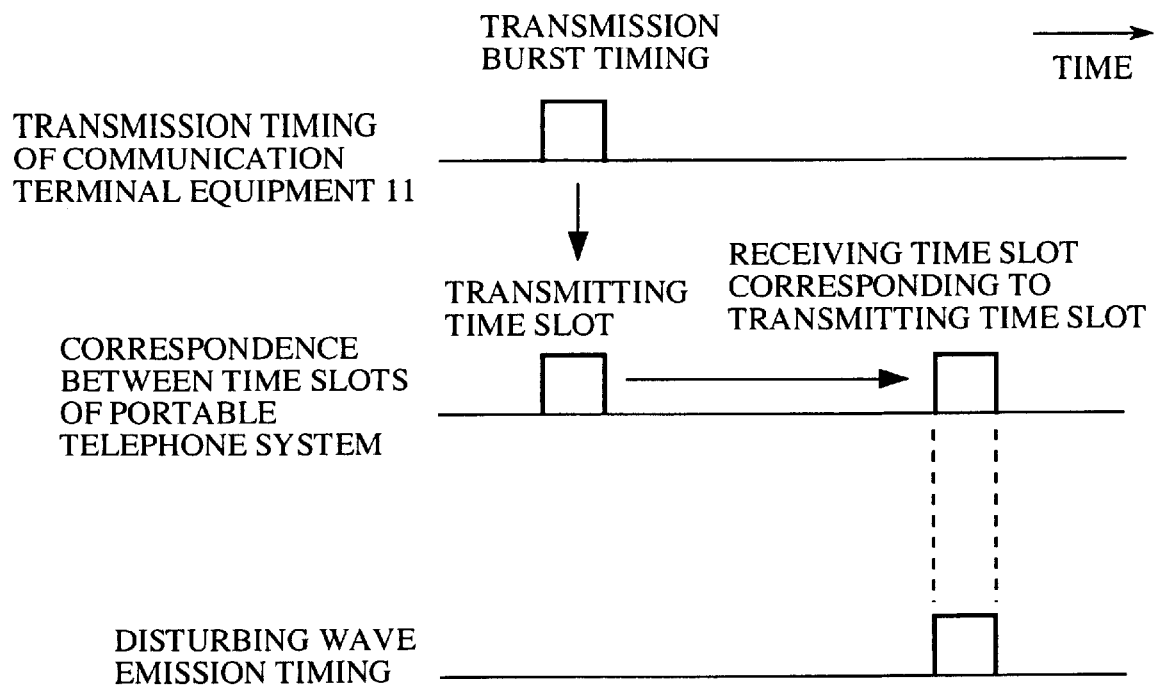
FIG. 15 is a diagram showing the transmission timing of communication terminal equipment and the disturbing wave emission timing according to a tenth embodiment of the present invention.

FIG. 15 is a diagram showing the relationship between the transmission timing of the communication terminal equipment 11 and the disturbing wave emission timing. Upon detecting the transmitted wave from the communication terminal equipment 11 by the transmitted wave detecting means 19, the control means 19 measures the transmitting wave frequency channel and, if the wave is being intermittently transmitted in pulse form, measures its timing as well.

And, based on the measured transmitting wave frequency channel and timing information, the control means 16 refers to the frequency band information on various TDMA mobile communication systems and the time slot information on the time axis prestored in the storage means 22, thereby specifying the receiving frequency channel and the receiving time slots that are used corresponding to the detected transmitting wave frequency channel.

Furthermore, the control means 16 controls the disturbing wave generating means 12 to emit a disturbing wave of the same frequency as the specified receiving frequency in synchronization with the receiving time slots. Thus, this embodiment narrows the band of the disturbing wave and intermittently emits it without impairing the communication inhibiting function, thereby preventing unnecessary disturbing operations other than the intended one and further cutting the power consumption of the disturbing wave generating means 12.

As described above, according to Embodiment 10, information on the frequency bands used in various mobile communication systems the time slot information on the time axis in various TDMA mobile communication systems are prestored in the storage means 22; and when the communication terminal equipment 11 is used at the place where its use is undesirable, the control means specifies, by referring to the storage means 22, the receiving frequency channel of the communication terminal equipment 22 and the time slots that correspond to the transmitting frequency channel and timing information of the communication terminal equipment 11 detected by the transmitted wave detecting means 19, and controls the disturbing wave generating means 12 to generate the disturbing wave of the specified receiving frequency in synchronization with the receiving time slots. This embodiment narrows the band of and intermittently emits the disturbing wave for inhibiting the use of the communication terminal equipment 11, thereby preventing unnecessary disturbing operations other than the intended one and, at the same time, reducing the power consumption of the disturbing wave generating means 12.

Embodiment 11

Figure 16:
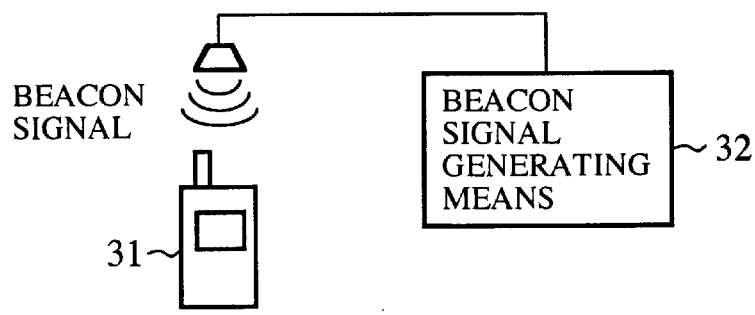
FIG. 16 is a diagram illustrating the configuration of a communication inhibiting system according to an eleventh embodiment of the present invention.

FIG. 16 is a diagram depicting the configuration of a communication inhibiting system according to an eleventh embodiment (Embodiment 11) of the present invention. In FIG. 16, reference numeral 32 denotes beacon signal generating means for generating a beacon signal of a predetermined frequency to a limited space with low power, and 31 denotes a portable telephone or similar communication terminal equipment that possesses a function of detecting the beacon signal generated by the beacon signal generating means 32 and turns off the communication function by itself.

Incidentally, upon detection of the beacon signal, the communication terminal equipment 31 turns off the communication function, but it is assumed that the communication terminal equipment 11 can perform automatic communications for position registration and so on.

The communication inhibiting system of this embodiment is composed of the communication terminal equipment 31 added with a new function and the beacon signal generating means 32, and is intended to inhibit the use of the communication terminal equipment 31 at the place where its use is undesirable.

Figure 17:
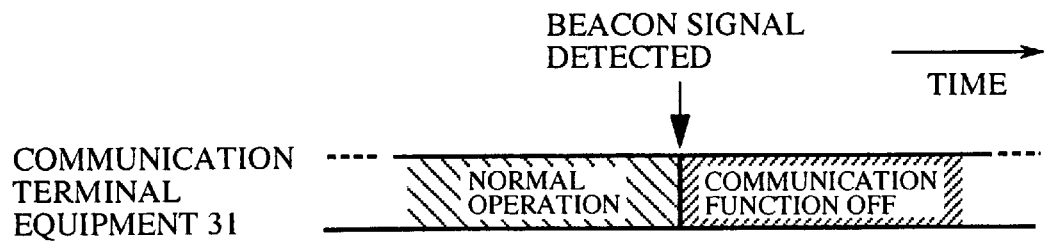
FIG. 17 is a diagram explanatory of the operation of communication terminal equipment according to the eleventh embodiment of the present invention.

FIG. 17 is a diagram for explaining the operation of the communication terminal equipment 31. When the communication terminal equipment 31 in normal communication enters an area where its use is undesirable and detects the beacon signal of a predetermined frequency from the beacon signal generating means 32, the terminal equipment turns off the communication function by itself as depicted in FIG. 17.

In this instance, the automatic communication function of the communication terminal equipment 31 for position registration and so forth is normally working; accordingly, it is possible to indicate each incoming call, by an incoming indicator or by keeping a history of incoming calls, to the user of the communication terminal equipment 31 who is inhibited from answering the call. Furthermore, it is possible to allow the reception of a character mail, voice mail or similar incoming call.

As described above, according to Embodiment 11, upon detecting the beacon signal of a predetermined frequency generated by the beacon signal generating means 32, the communication terminal equipment 31 turns off the communication function by itself, and consequently, it is possible to inhibit the use of the communication terminal equipment 31 at the place where its use is undesirable; but, since the incoming call receiving function is held on, it is possible to indicate an incoming call to the user.

Embodiment 12

Figure 18:
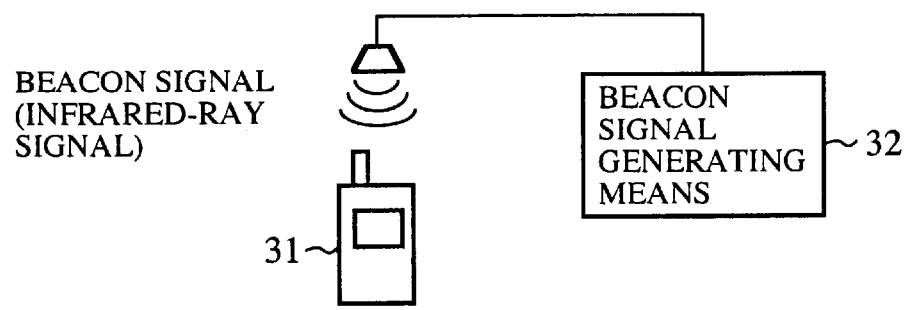
FIG. 18 is a diagram illustrating the configuration of a communication inhibiting system according to a twelfth embodiment of the present invention.

FIG. 18 is a diagram depicting the configuration of a communication inhibiting system according to a twelfth embodiment (Embodiment 12) of the present invention. In FIG. 18, the beacon signal generating means 32 emits, as the beacon signal, an infrared-ray or similar optical signal of a predetermined frequency to a limited area with low power, and the communication terminal equipment 31 such as a portable telephone has a function of receiving the infrared-ray or similar optical signal emitted thereto.

The communication inhibiting system of this embodiment is also composed of the communication terminal equipment 31 and the beacon signal generating means 32, and is intended to inhibit the use of the communication terminal equipment 31 in a relatively narrow coverage area of the infrared-ray or like optical signal.

Next, the operation of this embodiment will be described below.

The beacon signal generating means 32 emits the beacon signal of a predetermined frequency, as an infrared-ray or similar optical signal, to a limited area. Upon receiving the beacon signal in the form of an infrared-ray or like optical signal, the communication terminal equipment 31 turns off the communication function by itself. The call-receiving function of the terminal equipment is the same as in Embodiment 11.

As described above, according to Embodiment 12, the communication terminal equipment 31 turns off its communication function by itself upon receiving the beacon signal in the form of an optical signal from the beacon signal generating means 32, by which it is possible to inhibit the use of the communication terminal equipment 31 at the place where its use is undesirable; furthermore, since the call-receiving function is kept on, it is possible to indicate an incoming call to the user.

Embodiment 13

Figure 19:
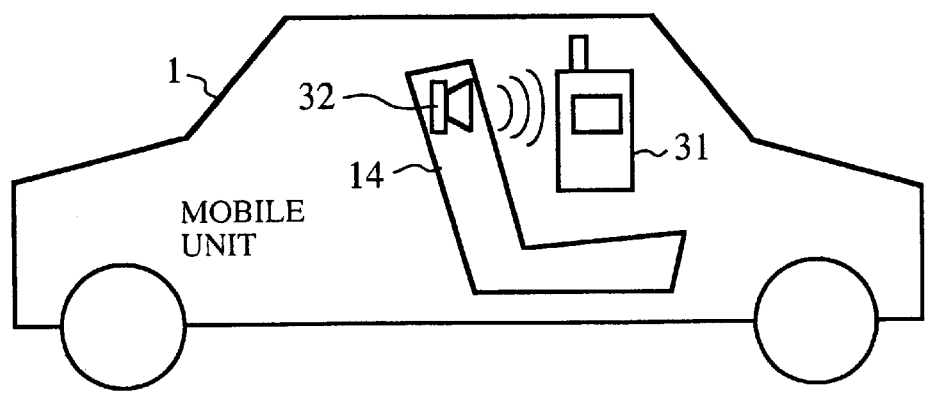
FIG. 19 is a diagram illustrating the configuration of a communication inhibiting system according to a thirteenth embodiment of the present invention.

FIG. 19 is a diagram depicting the configuration of a communication inhibiting system according to a thirteenth embodiment (Embodiment 13) of the present invention. In FIG. 19, the beacon signal generating means 32 is embedded in the back of the driver's seat of the mobile unit 1 such as an automobile. This embodiment is identical in configuration with Embodiment 11 shown in FIG. 16 except the above.

The communication inhibiting system of this embodiment is composed of the communication terminal equipment 31 such as a portable telephone and the beacon signal generating means 32, and is intended to inhibit the use of the communication terminal equipment 31 in the driver's seat of the mobile unit 1.

Next, the operation of this embodiment will be described below.

The beacon signal generating means 32 embedded in the driver's seat 14 is generating a beacon signal of a predetermined frequency to a limited area. Upon receiving the beacon signal, the communication terminal equipment 31 turns off the communication function by itself. The call-receiving function is the same as in Embodiment 11.

As described above, according to Embodiment 13, when the driver tries to use the communication terminal equipment 31 in the driver's seat, the communication terminal equipment 31 detects the beacon signal generated by the beacon signal generating means 32 and turns off the communication function, by which it is possible to inhibit the driver of the mobile unit 1 from using the terminal equipment; furthermore, since the call-receiving function is kept on, it is possible to indicate an incoming call to the user.

Besides, since the beacon signal generating means 32 is installed extremely close to the position where the communication terminal equipment 31 is used, the beacon signal can easily be focused at the driver's seat alone, and since the beacon signal generating means is embedded in the back of the driver's seat 14, it can be held out of the way.

Embodiment 14

The communication inhibiting system according to a fourteenth embodiment (Embodiment 14) is identical in configuration with Embodiment 11 shown in FIG. 16.

Next, the operation of this embodiment will be described below.

Figure 20:
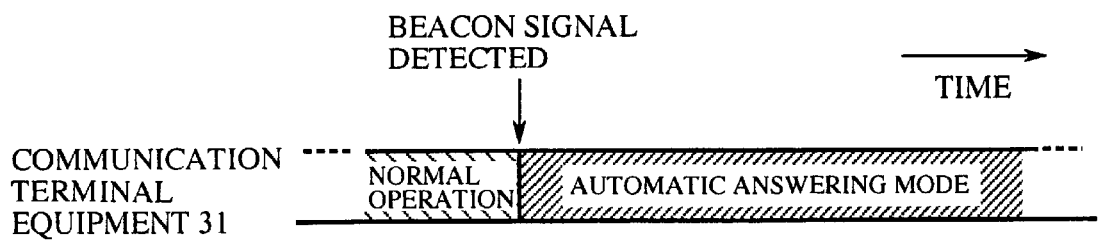
FIG. 20 is a diagram explanatory of the operation of communication terminal equipment according to a fourteenth embodiment of the present invention.

FIG. 20 is a diagram for explaining the operation of the communication terminal equipment 31. In the case where the communication terminal equipment 31 in its normal communication state enters into a place where its use is undesirable and detects the beacon signal generated by the beacon signal generating means 32, the communication terminal equipment leaves the normal operation mode and enters an automatic answering telephone mode, turning off the communication function.

As described above, according to Embodiment 14, upon detecting the beacon signal generated by the beacon signal generating means 32, the communication terminal equipment 31 enters the automatic answering telephone mode by itself and turns off the communication function, by which it is possible to inhibit the use of the communication terminal equipment 31; furthermore, since it enters the automatic answering telephone mode, messages of incoming calls can be recorded.

Embodiment 15

Figure 21:
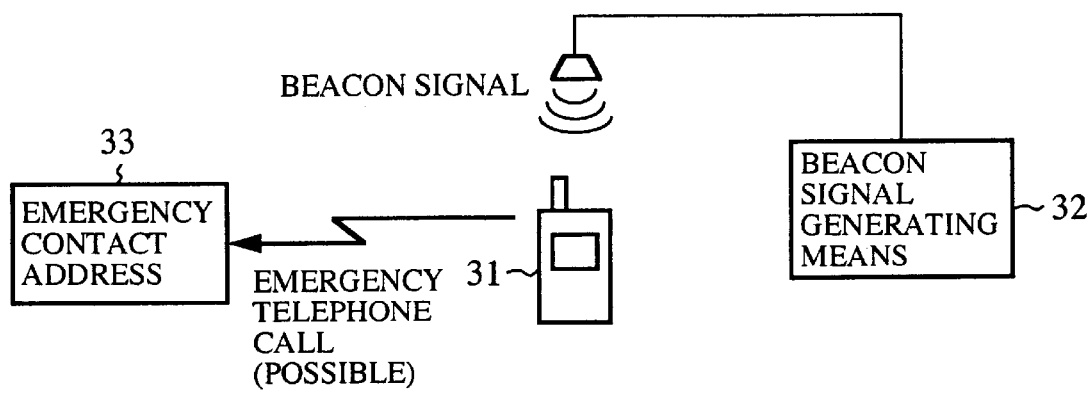
FIG. 21 is a diagram illustrating the configuration of a communication inhibiting system according to a fifteenth embodiment of the present invention.

FIG. 21 is a diagram depicting the configuration of a communication inhibiting system according to a fifteenth embodiment (Embodiment 15) of the present invention. In FIG. 21, reference numeral 33 denotes emergency contact addresses as of a police station, an emergency hospital and a firehouse; the communication terminal equipment 31 such as a portable telephone possesses a function of registering therewith telephone numbers of the emergency contact addresses 33 so that a call can be made to the registered telephone number of the desired one of the emergency contact addresses 33 even while the communication function is off after the detection of the beacon signal. This embodiment is identical in configuration with Embodiment 11 of FIG. 16 except the above.

Next, the operation of this embodiment will be described below.

Upon detecting the beacon signal of a predetermined frequency generated by the beacon signal generating means 32, the communication terminal equipment 31 turns off the communication function by itself, but when it becomes necessary to make an emergency call to the emergency contact address 33 such as a police station, emergency hospital or firehouse, it is possible to originate a call to the telephone number of the registered emergency contact address.

As described above, according to Embodiment 15, upon detecting the beacon signal generated by the beacon signal generating means, the communication terminal equipment 31 turns off the communication function by itself, by which it is possible to inhibit the use of the communication terminal equipment 31 at the place where its use is undesirable; furthermore, it is possible to deal flexibly with an emergency by making an emergency call to the emergency contact address 33.

Embodiment 16

Figure 22:
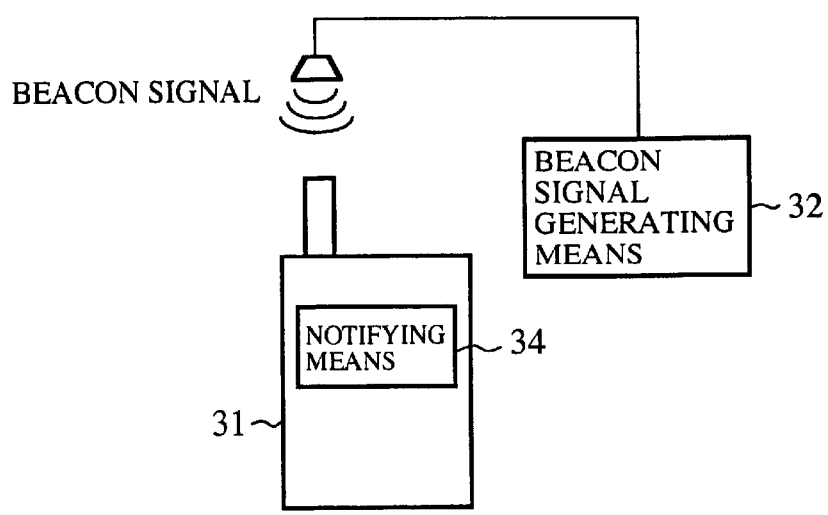
FIG. 22 is a diagram illustrating the configuration of a communication inhibiting system according to sixteenth embodiment of the present invention.

FIG. 22 is a diagram depicting the configuration of a communication inhibiting system according to a sixteenth embodiment (Embodiment 16) of the present invention. In FIG. 22, reference numeral 34 denotes notifying means of the communication terminal equipment 31, such as a portable telephone, for notifying the user that the communication function is off; this embodiment is identical with Embodiment 11 of FIG. 16 except the above.

Next, the operation of this embodiment will be described below.

When the communication terminal equipment 31 turns off the communication function upon detecting the beacon signal generated by the beacon signal generating means 32, the notifying means 34 notifies the user of the off state of the communication function by producing a beeping sound, providing a character display, or turning on a lamp.

As described above, according to Embodiment 16, upon detecting the beacon signal generated by the beacon signal generating means, the communication terminal equipment 31 turns off the communication function by itself, by which it is possible to inhibit the use of the communication terminal equipment 31 at the place where its use is undesirable; furthermore, it is also possible to notify the user that the communication function is off.

Embodiment 17

Figure 23:
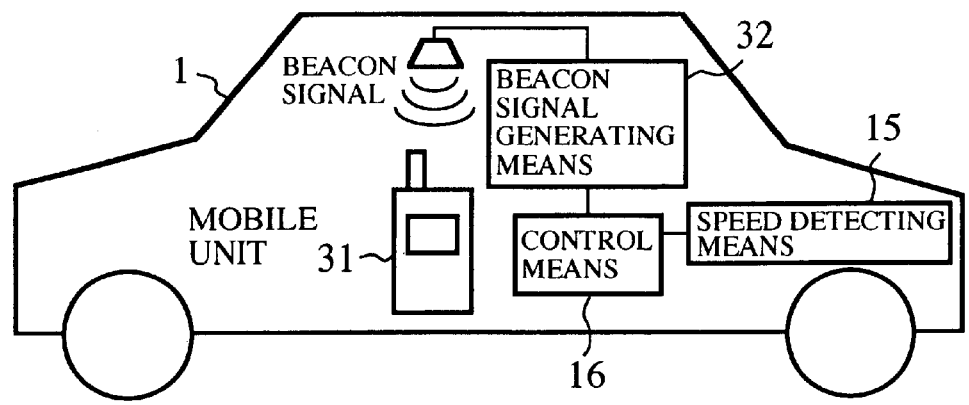
FIG. 23 is a diagram illustrating the configuration of a communication inhibiting system according to a seventeenth embodiment of the present invention.

FIG. 23 is a diagram depicting the configuration of a communication inhibiting system according to a seventeenth embodiment (Embodiment 17) of the present invention. In FIG. 23, reference numeral 15 denotes speed detecting means (travel/stop detecting means) for detecting whether the mobile unit 1 such as an automobile is traveling or at a standstill; and 16 denotes control means for controlling the beacon signal generating means 32 based on the result of detection by the speed detecting means 15. This embodiment is identical in configuration with Embodiment 11 of FIG. 16 except the above.

The communication inhibiting system of this embodiment is composed of the communication terminal equipment 31 such as a portable telephone, the speed detecting means 15, the control means and the beacon signal generating means 32, and is intended to inhibit the use of the communication terminal equipment 31 while the mobile unit 1 is traveling; the speed detecting means 15 is used as travel/stop detecting means, and the beacon signal is generated during driving of the mobile unit 1.

Next, the operation of this embodiment will be described below.

Based on the travel speed of the mobile unit 1, the speed detecting means 15 detects whether the mobile unit is traveling or at a standstill, and when the travel speed is zero and the mobile unit 1 is stationary, the speed detecting means 15 sends to the control means 16 information indicating that the mobile unit 1 is stationary. Upon receiving the information, the control means 16 controls the beacon signal generating means 32 to generate no beacon signal.

Thus, when the mobile unit 1 is stationary, the communication terminal equipment 31 can be used.

On the other hand, when the mobile unit 1 is traveling, the speed detecting means 15 sends to the control means 16 information that the mobile unit 1 is traveling. Upon receiving the information indicative of driving, the control means 16 controls the beacon signal generating means 32 to emit the beacon signal of a predetermined frequency to a limited area.

Thus, while he mobile unit 1 is traveling, the communication terminal equipment 31 cannot be used, and when it becomes necessary to use the communication terminal equipment 31, the driver needs to stop the mobile unit 1.

As described above, according to Embodiment 17, the speed detecting means 15 detects whether the mobile unit 1 is traveling or stationary, and when the mobile unit 1 is traveling, the control means 16 controls the beacon signal generating means to generate the beacon signal, thereby inhibiting the use of the communication terminal equipment 31.

Embodiment 18

Figure 24:
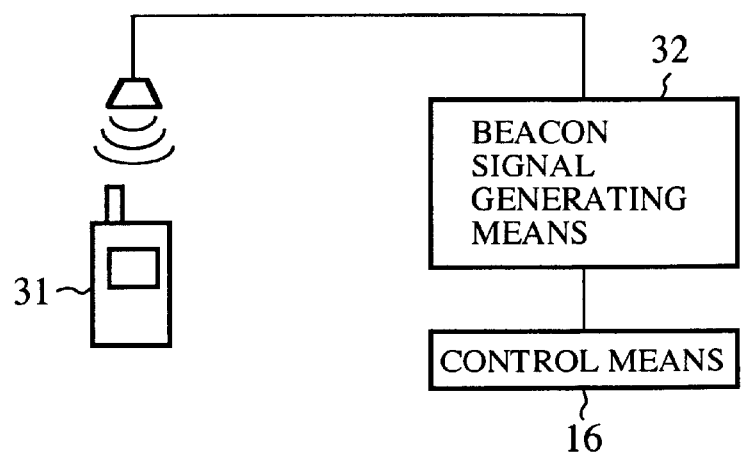
FIG. 24 is a diagram illustrating the configuration of a communication inhibiting system according to an eighteenth embodiment of the present invention.

FIG. 24 is a diagram depicting the configuration of a communication inhibiting system according to an eighteenth embodiment (Embodiment 18) of the present invention. In FIG. 24, reference numeral 16 denotes control means for controlling the beacon signal generating means 32 to generate the beacon signal intermittently in pulse form so that the communication terminal equipment 31 such as a portable telephone remains disabled after the detection of each beacon signal for a certain time at least longer than the intervals between beacon signals generated one after another. This embodiment is identical in configuration with Embodiment 11 of FIG. 16 except the above.

The communication inhibiting system of this embodiment is composed of the communication terminal equipment 31, the control means 16 and the beacon signal generating means 32.

Next, the operation of this embodiment will be described below.

Figure 25:
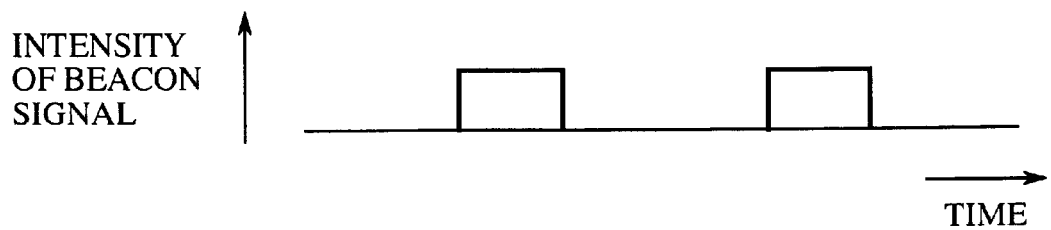
FIG. 25 is a diagram showing the timing for the emission of a beacon signal according to the eighteenth embodiment of the present invention.

FIG. 25 is a diagram depicting the beacon signal generating timing. The beacon signal generating means 32 generates, under the control of the control means 16, beacon signals intermittently in the form of pulses toward a limited area. Accordingly, the communication terminal equipment 31 remains disabled because of the intermittent generation of beacon signals.

Thus, the use of the communication terminal equipment 31 is inhibited by generating the beacon signals to the place where the use of the communication terminal equipment 31 is undesirable. Furthermore, since the control means 16 controls the beacon signal generating means 32 to intermittently generate the beacon signals just like pulses, the power consumption of the beacon signal generating means 32 is reduced.

As described above, according to Embodiment 18, the beacon signal generating means 32 intermittently generates the beacon signals in the form of pulses to the place where the use of the communication terminal equipment 31 is undesirable, by which it is possible to inhibit the use of the communication terminal equipment and cut the power consumption of the beacon signal generating means 32.

Embodiment 19

Figure 26:
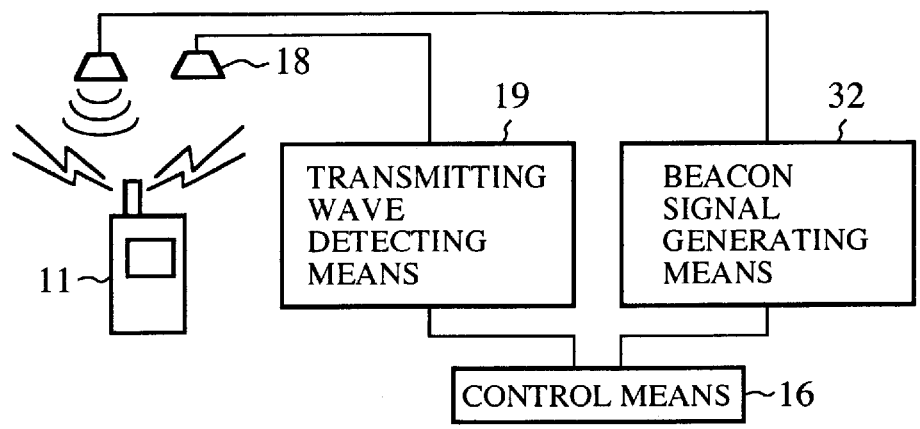
FIG. 26 is a diagram illustrating the configuration of a communication inhibiting system according to a nineteenth embodiment of the present invention.

FIG. 26 is a diagram depicting the configuration of a communication inhibiting system according to a nineteenth embodiment (Embodiment 19) of the present invention. In FIG. 26, reference numeral 18 denotes a transmitted wave detecting antenna for receiving a transmitted wave from the communication terminal equipment 31 such as a portable telephone; 19 denotes transmitted wave detecting means for detecting, from the transmitted wave received by the transmitted wave detecting antenna 18, that the communication terminal equipment 31 has output the transmitting wave; and 16 denotes control means for controlling the beacon signal generating means 32 based on the result of detection by the transmitted wave detecting means 19. This embodiment is identical in configuration with Embodiment 11 of FIG. 16.

The communication inhibiting system of this embodiment is composed of the communication terminal equipment 31, the transmitted wave detecting antenna 18, the transmitted wave detecting means 19, the control means 16 and the beacon signal generating means 32, and is intended to stop the use of the communication terminal equipment 31 if it is used at the place where its use is undesirable.

Next, the operation of this embodiment will be described below.

Figure 27:
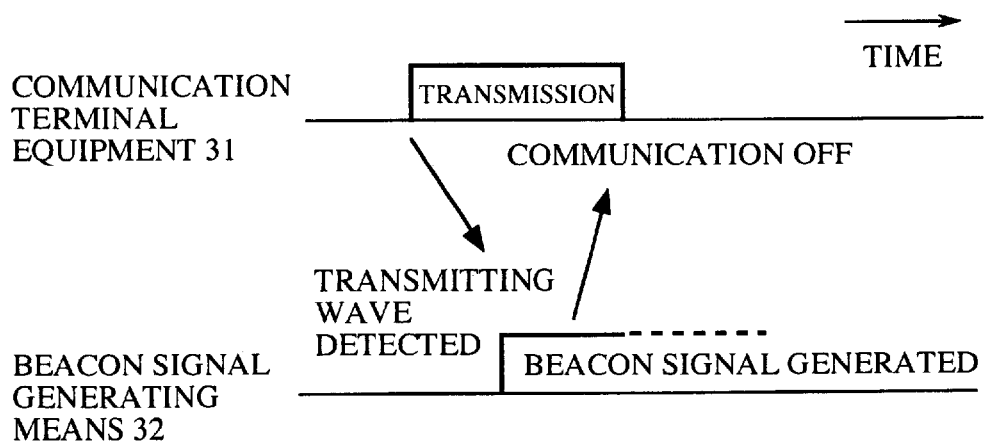
FIG. 27 is a diagram depicting the operation timing of communication terminal equipment and beacon signal generating means according to the nineteenth embodiment of the present invention.

FIG. 27 is a diagram showing the operation timing of the communication terminal equipment 31 and the beacon signal generating means 32. If the user uses the communication terminal equipment 11 and the transmitting wave is output therefrom at the place where its use is undesirable, the transmitted wave detecting means 19 detected the transmitted wave received by the transmitted wave detecting antenna 18, and send to the control means 16 information indicating the use of the communication terminal equipment 31.

Upon receiving the information indicating the use of the communication terminal equipment 31 at the place where its use is undesirable, the control means 16 controls the beacon signal generating means 32 to generate the beacon signal to a limited area to inhibit the use of the communication terminal equipment 31 as depicted in FIG. 27.

Thus, the use of the communication terminal equipment 31 is inhibited by generating the beacon signal to the place where the use of the communication terminal equipment 31 is undesirable. Moreover, while the communication terminal equipment outputs no transmitting wave, the control means 16 controls the beacon signal generating means 32 not to generate the beacon signal, thereby cutting the power consumption of the beacon signal generating means 32.

As described above, according to Embodiment 19, when the communication terminal equipment 31 is used at the place where its use is undesirable, the beacon signal generating means 32 generates the beacon signal, by which the use of the communication terminal equipment 32 can be inhibited and the power consumption of the beacon signal generating means 32 can be cut.

Embodiment 20

Figure 28:
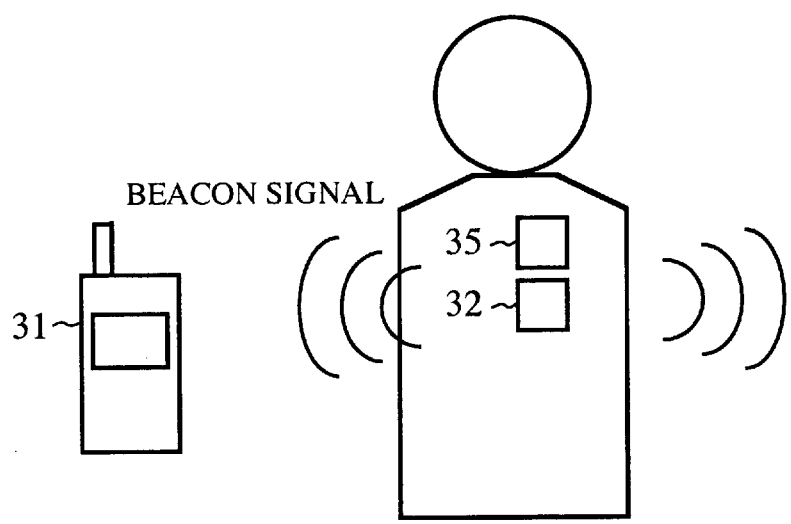
FIG. 28 is a diagram illustrating the configuration of a communication inhibiting system according to a twentieth embodiment of the present invention.

FIG. 28 is a diagram depicting the configuration of a communication inhibiting system according to a twentieth embodiment (Embodiment 20) of the present invention. In FIG. 28, reference numeral 31 denotes a portable telephone or similar communication terminal equipment which, upon detecting the beacon signal, stops all transmitting operations including position registration and so forth; 32 denotes a small, non-directional beacon signal generating means; and 35 a heart pacemaker.

Next, the operation of this embodiment will be described below.

By incorporating the small, non-directional beacon signal generating means 32 in a gear (a medical device, the passenger cabin of an airplane, or the like) which is readily affected by waves transmitted from the communication terminal equipment 31, or by carrying such beacon signal generating means with a user of the heart pacemaker 35, for example, it is possible to prevent the transmitting operation of the communication terminal equipment 31. Since the beacon signal has a predetermined frequency and needs only to function normally in a limited area extremely close thereto, a very low output level is enough; therefore, it is easy to prevent the terminal equipment from exerting bad influence on the above-mentioned gear.

As described above, according to Embodiment 20, by incorporating the beacon signal generating means 32 in a gear which is readily affected by the wave transmitted from the communication terminal equipment 31, or by carrying the beacons signal generating means with the user of the heart pacemaker 31, it is possible to prevent the transmitting operation of the communication terminal equipment 31 around him.

Effect of the Invention

As described above, the communication inhibiting apparatus and the communication inhibiting system according to the present invention are suitable to inhibit communications to and from a portable telephone or similar communication terminal equipment at limited areas where its use is undesirable.

What is claimed is:

1. A communication inhibiting apparatus, comprising:

disturbing wave generating means for generating a disturbing wave signal which disturbs communications to and from a portable telephone or similar communication terminal equipment;

disturbing wave emitting means for emitting the disturbing wave signal generated by said disturbing wave generating means as a disturbing wave to said communication terminal equipment;

transmitted wave detecting means for detecting a transmitted wave from the communication terminal equipment; and control means for controlling the disturbing wave generating means to generate the disturbing wave signal upon detecting said transmitted wave by said transmitted wave detecting means, wherein said control means controls the disturbing wave generating means to generate the disturbing wave signal a predetermined time after the detection of the transmitted wave by the transmitted wave detecting means in order to give said communication terminal equipment a predetermined time for recording a history of incoming calls and/or for receiving a call which does not need immediate reception by a receiver, such as a text message or a voice mail message.

2. A communication inhibiting apparatus, comprising:

disturbing wave generating means for generating a disturbing wave signal which disturbs communications to and from a portable telephone or similar communication terminal equipment;

disturbing wave emitting means for emitting the disturbing wave signal generated by said disturbing wave generating means as a disturbing wave to said communication terminal equipment;

transmitted wave detecting means for detecting a transmitted wave from the communication terminal equipment;

control means for controlling the disturbing wave generating means to generate the disturbing wave signal upon detecting said transmitted wave by said transmitted wave detecting means; and storage means for storing frequency channel information on various mobile communication systems, wherein
upon detecting the transmitted wave from the communication terminal equipment by the transmitted wave detecting means, the control means estimates, based on the frequency channel information stored in said storage means, the receiving frequency of said communication terminal equipment which is used corresponding to the frequency of said transmitted wave, and controls the frequency of the disturbing wave signal which is generated by the disturbing wave generating means.

3. A communication inhibiting apparatus, comprising:

disturbing wave generating means for generating a disturbing wave signal which disturbs communications to and from a portable telephone or similar communication terminal equipment;

disturbing wave emitting means for emitting the disturbing wave signal generated by said disturbing wave generating means as a disturbing wave to said communication terminal equipment;

transmitted wave detecting means for detecting a transmitted wave from the communication terminal equipment;

control means for controlling the disturbing wave generating means to generate the disturbing wave signal upon detecting said transmitted wave by said transmitted wave detecting means; and storage means for storing frequency band information and TDMA slot information on the time axis of TDMA mobile communication systems, wherein
upon detecting the transmitted wave from the communication terminal equipment by the transmitted wave detecting means, the control means estimates, based on the frequency band information and the TDMA slot information stored in said storage means, the receiving frequency of the communication terminal equipment which is used corresponding to the frequency of said transmitted wave, and controls the frequency and generation timing of the disturbing wave signal which is generated by the disturbing wave generating means.

* * * * *